United States Patent [19]

Davis

[11] Patent Number: 5,316,272

[45] Date of Patent: May 31, 1994

[54] LIQUID SPRING VEHICULAR SUSPENSION SYSTEM AND ASSOCIATED CONTROL APPARATUS

[75] Inventor: Leo W. Davis, Dallas, Tex.

[73] Assignee: Richard J. Meyer, La Habra, Calif.

[21] Appl. No.: 121,228

[22] Filed: Sep. 14, 1993

Related U.S. Application Data

[63] Continuation of Ser. No. 927,795, Aug. 10, 1992, abandoned, which is a continuation of Ser. No. 771,814, Oct. 7, 1991, abandoned, which is a continuation of Ser. No. 614,012, Nov. 14, 1990, abandoned, which is a continuation of Ser. No. 465,519, Jan. 17, 1990, abandoned, which is a continuation of Ser. No. 189,241, May 2, 1988, abandoned, which is a continuation-in-part of Ser. No. 941,289, Dec. 12, 1986, Pat. No. 4,741,516, which is a continuation-in-part of Ser. No. 907,140, Sep. 12, 1986, Pat. No. 4,735,402.

[51] Int. Cl.$^5$ ............................ F16F 5/00; B60G 11/26
[52] U.S. Cl. .................................. 267/64.13; 188/299; 267/120; 280/707
[58] Field of Search ............. 267/64, 73, 64.14, 64.16, 267/120; 280/703, 707; 188/268, 269, 299, 280, 282, 285, 312, 314, 319

[56] References Cited

U.S. PATENT DOCUMENTS

| 2,072,701 | 2/1937 | Majean | 192/88 |
|---|---|---|---|
| 2,225,986 | 12/1940 | Glezen | 188/88 |
| 3,146,862 | 9/1964 | van Winsen | 188/88 |
| 3,483,952 | 12/1969 | Cardwell | 188/96 |
| 4,079,923 | 3/1978 | Kirchner | 267/64.13 |
| 4,099,602 | 7/1978 | Kourbetsos | 188/300 |
| 4,212,087 | 7/1980 | Mortensen | 3/1.2 |
| 4,305,486 | 12/1981 | Cowen | 188/299 X |
| 4,513,833 | 4/1985 | Sheldon | 188/299 X |
| 4,561,641 | 12/1985 | De Young et al. | 188/268 X |
| 4,638,895 | 1/1987 | Taylor et al. | 188/280 |
| 4,671,392 | 6/1987 | Wossner | 188/299 |
| 4,729,459 | 3/1988 | Inagaki et al. | 188/1.11 |
| 4,733,883 | 3/1988 | Sugasawa et al. | 280/707 |
| 4,741,516 | 5/1988 | Davis | 267/64.13 |
| 4,793,451 | 12/1988 | Taylor | 267/64.13 X |

FOREIGN PATENT DOCUMENTS

| 3608738 | 9/1987 | Fed. Rep. of Germany | 188/299 |
|---|---|---|---|
| 144808 | 11/1980 | German Democratic Rep. | |
| 0160707 | 10/1982 | Japan | 267/64.13 |
| 0226311 | 11/1985 | Japan | 267/64.16 |
| 2192967 | 1/1988 | United Kingdom | 188/299 |

*Primary Examiner*—Matthew C. Graham
*Attorney, Agent, or Firm*—Hubbard, Tucker & Harris

[57] ABSTRACT

A vehicular suspension system incorporates, at each wheel, a liquid spring which internally utilizes a compressible liquid to generate spring and damping forces that yieldingly resist vertical wheel deflection relative to the vehicle frame. The spring and damping characteristics of each liquid spring are computer adjusted during vehicle operation in response to sensed variations in various liquid spring and vehicle operating parameters.

1 Claim, 1 Drawing Sheet

LIQUID SPRING VEHICULAR SUSPENSION SYSTEM AND ASSOCIATED CONTROL APPARATUS

CROSS-REFERENCE TO RELATED APPLICATION

This application is a continuation of application Ser. No. 07/927,795, filed Aug. 10, 1992, now abandoned, which is a continuation of application Ser. No. 771,814, filed Oct. 7, 1991, now abandoned which is a continuation of Ser. No. 614,012, filed Nov. 14, 1990, now abandoned which is a continuation of Ser. No. 465,519, filed Jan. 17, 1990, now abandoned, which is a continuation of Ser. No. 189,241, filed May 2, 1988 now abandoned, which is a continuation-in-part of Ser. No. 941,289, filed Dec. 12, 1986 now U.S. Pat. No. 4,741,516 which is a continuation-in-part of Ser. No. 907,140, filed Sep. 12, 1986, now U.S. Pat. No. 4,735,402. The specification and drawing portions of such applications directed to the structure and operation of liquid springs being hereby incorporated by reference herein. The specification and drawing portions of copending U.S. application Ser. No. 189,236, entitled "COMPACT LIQUID SPRING VEHICULAR SUSPENSION SYSTEM" by Leo W. Davis, filed on even data herewith, directed to the structure and operation of liquid springs are also incorporated herein by reference.

BACKGROUND OF THE INVENTION

The present invention relates generally to vehicular suspension systems and, in a preferred embodiment thereof, more particularly provides a liquid spring vehicular suspension system in which the spring and damping characteristics of each liquid spring are computer adjusted, during vehicle operation, in response to sensed variations in liquid spring and vehicle operating parameters.

In the past, various proposals have been made for replacing the conventional hydraulic shock absorber and exterior coil spring assemblies in vehicular suspension systems with more compact devices known as liquid springs. A liquid spring basically comprises a cylindrical housing having an internal chamber with a compressible liquid therein, a piston reciprocably disposed in the chamber, and a rod structure axially movable into and out of the chamber, secured to the piston, and having an outer longitudinal portion projecting outwardly of one of the housing ends. With the liquid spring operatively interconnected between the vehicle frame and an associated wheel support structure, the compressible liquid within the liquid spring generates both spring and damping forces in the suspension system in response to relative axial translation between the rod structure and housing of the liquid spring caused by relative vertical displacement between the wheel and the frame. A more detailed description of the general structure and operation of a liquid spring incorporated in a vehicular suspension system may be found in U.S. application Ser. No. 941,289, entitled "FLUID SUSPENSION SPRING AND DAMPER FOR VEHICLE SUSPENSION SYSTEM", which has been incorporated herein by reference.

Various mechanisms have been proposed for selectively adjusting the spring force and/or damping force characteristics of liquid springs to settings which remain essentially constant during vehicle operation until readjusted when the vehicle is at rest. Thus, these essentially fixed spring force and damping force characteristics represent at best predetermined compromise settings adapted to handle an often wide range of road conditions and vehicle operational inputs (such as steering input, braking forces, vehicle speed and the like) encountered during operation of the vehicle.

It can be seen that it would be desirable to provide a liquid spring vehicular suspension system in which the spring force and damping force characteristics of the liquid springs are automatically adjusted, during vehicle operation, to compensate for variations in both road conditions and vehicle operational inputs, or any combination thereof. It is accordingly an object of the present invention to provide such a system.

SUMMARY OF THE INVENTION

In carrying out principles of the present invention, in accordance with a preferred embodiment thereof, an improved liquid spring vehicular suspension system is provided in which the spring and damping force characteristics of each liquid spring are continuously computer adjusted, during vehicle operation, in response to sensed variations in either or both liquid spring and vehicle operating parameters.

Each liquid spring comprises a housing having a cylindrical chamber therein in which a piston is reciprocably disposed and axially divides the chamber into bounce and rebound subchambers. Coaxially secured to the piston, and slidably and sealingly carried by the housing for axial movement relative thereto into and out of the chamber, is an elongated, hollow rod structure having an outer longitudinal portion projecting outwardly of the housing. A suitable compressible liquid is disposed within the bounce and rebound chambers and within the interior of the rod structure. A damping bypass passage, which intercommunicates the bounce and rebound chambers within the housing, is defined by the interior rod chamber, a first pair of fluid transfer ports formed radially through the rod structure closely adjacent the rebound chamber side of the piston, and a second pair of radially extending fluid transfer ports forms through the rod structure closely adjacent the bounce chamber side of the piston. First and second rotary valve means are disposed within the rod chamber and are selectively and independently operable to respectively meter compressible liquid flow through the first and second rod port pairs.

Each of the liquid springs has its longitudinally outer rod structure portion secured to the vehicle frame, and has its cylinder secured to an associated wheel structure in a manner such that vertical deflection of the wheel structure relative to the frame causes relative axial displacement between the rod structure and the housing and causes the compressible liquid to exert spring and damping forces that yieldingly and reactively resist vertical wheel displacement. First, second, and third control means are provided and are respectively operable to selectively and independently operate the first and second valve means to meter compressible liquid flow through the first and second rod port pairs, to selectively vary the effective volume of the compressible liquid, and to selectively vary the pressure of the compressible liquid.

Means are provided for generating liquid spring operating parameter signals including a first signal indicative of the relative axial position of the piston within the housing chamber, a second signal indicative of the compressible liquid pressure in the rebound subchamber, a third signal indicative of the compressible liquid pressure in the bounce subchamber, and a fourth signal indicative of the compressible liquid pressure in the rod structure chamber. Additionally, means are provided for generating vehicle operating parameter signals which representatively include signals indicative of the road contour ahead of the moving vehicle, the sense and magnitude of steering input to the vehicle, the speed of the vehicle, and the braking force being exerted on the vehicle.

Computer means receive the liquid spring operating parameter signals, and the vehicle operating parameter signals, and responsively generate output signals that are used to operate the first, second and third control means in a manner automatically adjusting the spring and damping characteristics of each liquid spring during vehicle operation.

DETAILED DESCRIPTION

Figures 1, 2:
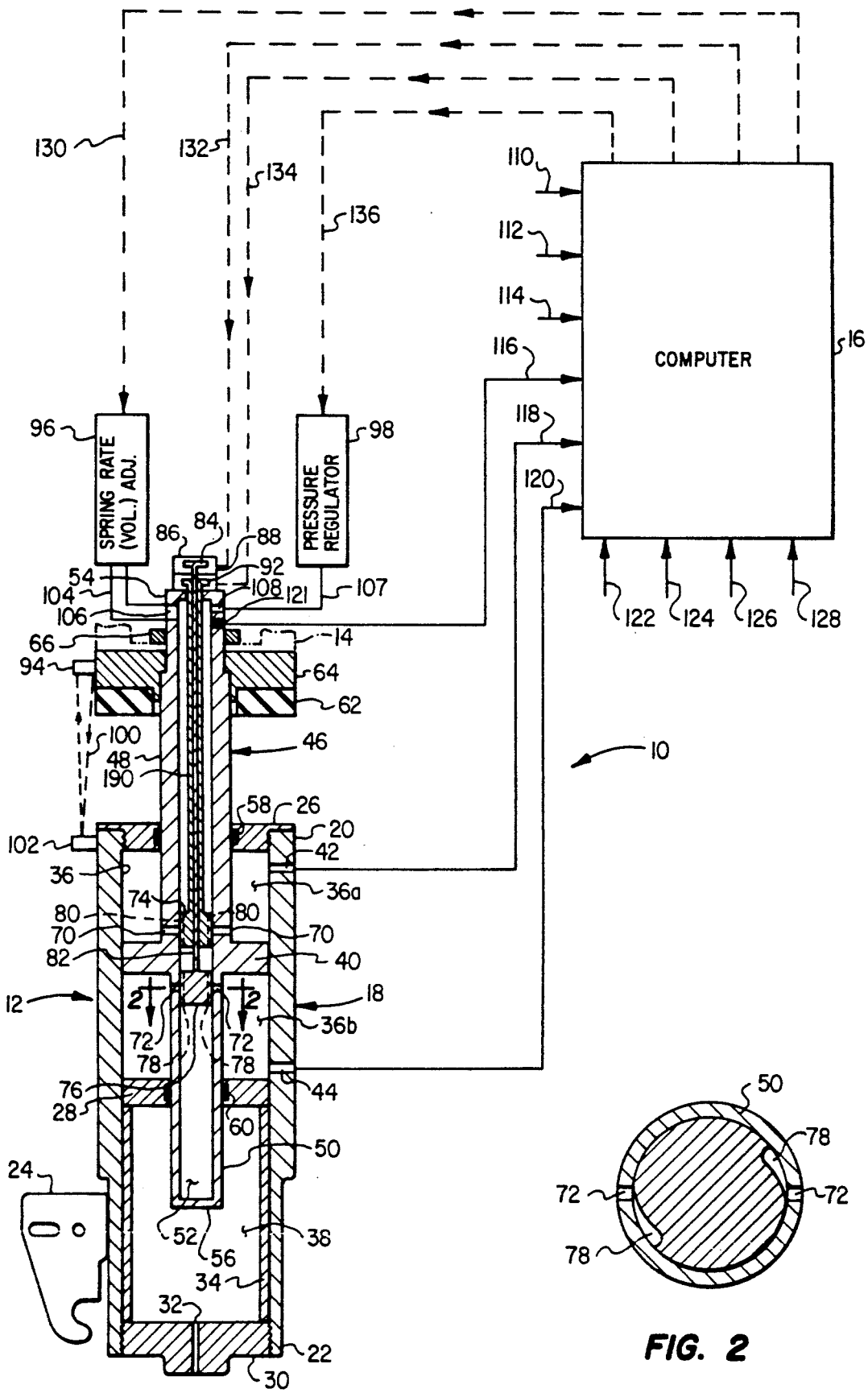
FIG. 1 is a schematic, partially cross-sectional illustration of a portion of a computer-controlled liquid spring vehicular suspension system which embodies principles of the present invention.
FIG. 2 is an enlarged scale cross-sectional view through the liquid spring portion of the system, taken along line 2—2 of FIG. 1.

Schematically illustrated in FIG. 1 is a portion of an improved liquid spring vehicular suspension system 10 which embodies principles of the present invention and representatively incorporates a generally vertically oriented, double rod end type liquid spring 12 at each wheel of the vehicle. In a manner subsequently described, the liquid spring 12 is operatively connected at its upper end to the vehicle frame 14, and at its lower end to the support structure (not shown) of its associated wheel, and operates to provide the requisite suspension system spring and damping forces at its associated wheel location. Also as later described, the liquid spring 12 is controlled in a unique fashion utilizing a computer 16 which continuously and automatically adjusts key operational aspects of the spring in response to sensed variations in selected vehicle and liquid spring operating parameters.

Liquid spring 12 includes an elongated, generally vertically oriented tubular housing 18 having an upper end 20 and a lower end 22. A suitable mounting bracket 24 is secured to the lower housing end 22 and is connected to the wheel support structure (not shown). An upper annular gland member 26 is threaded into the upper housing end 20, an annular intermediate gland member 28 is positioned within a vertically intermediate portion of the housing interior, and a cylindrical plug member 30 is threaded into the lower housing end 22 and is provided with a small central vent passage 32 extending axially therethrough. Extending axially within the housing interior between the gland 28 and the plug 30 is an elongated cylindrical spacer sleeve 34.

The gland members 26, 28 and the plug 30 define within the housing interior an upper chamber 36, which contains a compressible liquid, and a vented lower rod travel chamber 38. An annular piston 40 is vertically reciprocable within the upper chamber 36 and divides it into an upper "rebound" chamber $36_a$, and a lower "bounce" chamber $36_b$. For purposes later described, a pair of small side wall ports 42 and 44 are formed in the housing 18 and respectively extend into the chambers $36_a$, $36_b$ adjacent the upper and lower gland members 26, 28. An elongated hollow cylindrical rod structure 46 is coaxially secured to the annular piston 40 and includes an upper rod section 48 extending upwardly from an upper end face of piston 40, and a smaller diameter lower rod section 50 extending downwardly from the lower end face of the piston. Rod structure 46 has a cylindrical, compressible liquid-filled interior chamber 52 extending between its closed upper and lower ends 54 and 56 and passing through the central opening in piston 40.

The upper rod section 48 is slidably and sealingly carried within a suitable seal structure 58 in upper gland member 26, and the lower rod section 50 is similarly carried within a seal structure 60 within the intermediate gland member 28. An upper end portion of rod section 48 is extended upwardly through a resilient bounce pad member 62, a rigid bounce retainer member 64, and the vehicle frame 14. Such upper rod end portion is captively secured to the frame 14 by means of a lock nut 66 threaded onto the upper rod end and bearing against the frame 14.

With the vehicle at rest, the portion of its weight borne by the wheel structure associated with the illustrated liquid spring 12 exerts a downward axial force on the upper rod section 48 tending to force it further into the chamber 36 while at the same time forcing the smaller diameter rod section 50 downwardly through the intermediate gland member 28 and into the vented chamber 38 to simultaneously withdraw the lower rod section 50 from the chamber 36. Downward rod structure movement in this manner progressively decreases the volume of the compressible liquid within the chamber 36 due to the difference in the outer diameters of the upper and lower rod sections 48, 50. This volume decrease, in turn, increases the pressure of the compressible fluid which exerts a progressively increasing net upward force on the piston and rod structure due to the fact that the diameter of the lower seal 60 is less than the diameter of the upper seal 58. When this net, upwardly directed fluid pressure force on the piston and rod structure equals the portion of the vehicle weight borne by its associated wheel structure, the piston 40 is at a vertical equilibrium point within the housing chamber 36—a point which, as a general proposition, establishes the "ride height" of the vehicle when it is at rest or traveling along essentially level terrain.

When an additional, upwardly directed "bounce" force is imposed upon the wheel structure, the housing 18 is moved further upwardly along the rod structure 46 in a manner further inserting the larger diameter rod section 48 into the chamber 36 while at the same time further withdrawing the smaller diameter rod section 50 therefrom and progressively increasing the compressible liquid pressure and the net upward pressure force on the piston 40. When the upward wheel structure force is decreased, for example when the wheel structure travels downwardly through the "rebound" portion of its overall wheel stroke, the internal fluid pressure force within the housing 18 acts to drive the housing downwardly relative to the rod structure 46. In this manner, the rod travel-responsive pressure variations in the compressible fluid provide the liquid spring 12 with the "spring" portion of its overall suspension action.

The "damping" portion of the spring's overall suspension action is accomplished in the present invention by controllably permitting compressible liquid bypass flow across piston 40 from bounce chamber 36$_b$, through rod chamber 52 and into rebound chamber 36$_a$ as the housing 18 is deflected upwardly relative to the piston 40, and controllably permitting compressible liquid bypass flow across the piston from rebound chamber 36$_a$, through rod chamber 52 and into bounce chamber 36$_b$ as the housing 18 is deflected downwardly relative to the piston 40. Such damping bypass flow is representatively provided for by means of a diametrically opposed pair of radially extending ports 70 formed through upper rod section 48 just above the piston 40, and a diametrically opposed pair of radially extending ports 72 formed through lower rod section 50 just below the piston 40.

Inward and outward flow through the rod ports 70, 72 may be selectively controlled by a pair of cylindrical rotary valve members 74, 76 coaxially and slidably disposed within the interior of rod structure 46, and respectively covering the inner ends of rod ports 70 and rod ports 72. Lower valve member 76 has axially formed therethrough a diametrically opposed pair of peripherally disposed metering passages 78 (see FIG. 2) having generally teardrop shaped cross-sections. By rotating the valve member 76 relative to the rod structure 46, the valve member passages 78 may be moved into and out of metering registration with the rod ports 72 to thereby meter compressible liquid flow between bounce chamber 36$_b$ and rod chamber 52. In a similar fashion, the upper rotary valve member 74 is provided with axially extending peripheral metering of passages 80 which, upon appropriate rotation of the valve member 74, may be moved into and out of metering registration with the rod ports 70 to thereby selectively meter compressible liquid flow between the bounce chamber 36$_a$ and the rod chamber 52.

The lower valve member 76 is secured to and may be rotated by an elongated actuating shaft 82 which extends upwardly through the rod chamber 52 and outwardly through the upper rod end 54. The upper end of shaft 82 is operatively secured to a high speed rotary actuator 84 disposed within a small control housing 86 secured to the upper end of a similar control housing 88 affixed to the upper rod end 54. A hollow tubular control rod 90 slidably circumscribes the rod 82 and is secured at its lower end to the valve member 74 which also slidably circumscribes the rod 82. The upper end of the outer rod 90 is operatively secured to a high speed rotary actuator 92 disposed within housing 88. It can be seen that by appropriately operating the rotary actuators 84 and 92 the rods 82 and 90, and thus the valve members 76 and 74, may be selectively and independently rotated within the rod structure 46 to accordingly selectively and independently meter to a desired degree compressible liquid flow in either radial direction through the rod ports 70 and 72. If desired, the actuators 84 and 92 could be disposed within the interior of upper rod section 48.

The use of the valves 74, 76 in conjunction with the compressible liquid-filled rod chamber 52 and the rod ports 70, 72 permits both the bounce and rebound damping characteristics of the liquid spring 12 to be selectively, independently and quite rapidly varied (by rotation of either or both of the valve control rods 82, 90) within a very wide adjustment range. For example, with both of the valves 74, 76 rotated to their maximum open positions relative to rod ports 70 and 72, the damping forces on piston 40 as the housing 18 is deflected in either vertical direction are at their minimum magnitudes,—the piston bypass passage defined by rod ports 70 and 72, the valve passages 78 and 80, and the rod chamber 52 being at its least restrictive setting. At the other end of the damping spectrum, when both of the valves 74, 76 are rotated to close off their associated rod ports 70 and 78, the available bounce and rebound damping forces are maximized.

Between these two extremes lie a nearly infinite number of relative valve positions and correspondingly available bounce and rebound damping force settings. Not only may the aforementioned piston bypass passage be variably restricted by valves 74 and 76, but the rod chamber 52 may also be selectively communicated with or shut off from either or both of the rebound and bounce chambers 36$_a$ and 36$_b$, thereby nearly instantaneously adding or subtracting the rod chamber compressible liquid volume to or from either or both of the bounce and rebound chambers to further modify the damping characteristics of the liquid spring 12. This permits the rod chamber compressible liquid to be used, for example, to store compression energy as the housing 18 is deflected in one vertical direction, and release the stored compression energy as the housing deflects in the opposite vertical direction.

Further control elements operatively associated with the liquid spring 12 include a photoelectric position sensor 94, a spring rate adjustment mechanism 96, and a pressure regulator mechanism 98, each of which is schematically depicted in FIG. 1. Position sensor 94 is secured to the bounce retainer member 64 and is operative to project a light beam 100 onto a position indicating tab 102 movably carried by the upper end of the housing 18. The beam 100 is reflectively returned from the tab 102 to the sensor 94, thereby permitting the sensor 94 to instantaneously sense the vertical distance therefrom of the tab 102. Such distance is, of course, directly correlated to the distance between the upper end of the housing 18 and the bounce pad 62, and to the position of the piston 40 relative to the opposite ends of the compressible liquid-filled chamber 36. It will be appreciated that the sensor 94 and its associated tab 102 could be mounted on a variety of alternate, relatively movable portions of the rod and housing sections of the liquid spring if desired.

The spring rate adjustment mechanism 96 is provided with an interior, compressible liquid-filled chamber (not shown) which is selectively compressible and expandable and is communicated with the rod chamber 52 via a conduit 104 connected to a side wall transfer port 106 formed radially through the upper end of the rod section 48. By expanding the internal chamber in the mechanism 96, the effective overall compressible liquid volume of the liquid spring 12 is increased, while contracting such chamber decreases the effective compressible liquid volume.

The pressure regulator mechanism 98 may be of a construction similar to that of spring rate adjustment mechanism 96, having an internal, compressible liquid-filled chamber which is selectively compressible and extendable, and communicates with the rod chamber 52 via a conduit 107 and a rod side wall port 108. By selectively compressing or expanding the internal chamber of mechanism 98, the pressure of the compressible fluid within the liquid spring housing and rod chambers 36 and 52 may be selectively varied.

To uniquely control the operation of the liquid spring 12 during vehicle operation, control input signals 110, 112, 114, 116, 118 and 120, each associated with an operational aspect of the liquid spring itself, are transmitted from the liquid spring 12 to the computer 16. Input signal 110, suitably transmitted from the position sensor 94, is indicative, as previously described, of the distance between the upper end of the housing 18 and the resilient bounce pad 62, and is therefore indicative of the axial position of the piston 40 relative to the opposite ends of the chamber 36 defined by the gland members 26 and 28. Input signals 112 and 114 are respectively indicative of the rotational positions of the upper and lower valve member 74 and 76 relative to their associated rod ports 70 and 72. Input signals 116, 118 and 120 are pressure signals transmitted to the computer via suitable conduits connected to a rod port 121, and the previously mentioned housing ports 42 and 44, and are respectively indicative of the compressible liquid pressures in the rod chamber 52, the rebound subchamber $36_a$, and the bounce subchamber $36_b$.

In addition to the input signals 110–120 representing selected operational parameters of the liquid spring itself, input signals 122, 124, 126 and 128, each indicative of a representative operational parameter of the vehicle, are suitably transmitted to the computer 16. Signal 122 is indicative of the road contour ahead of the vehicle, signal 124 is indicative of the degree and sense of the steering input to the vehicle, signal 126 is indicative of the vehicle's speed, and signal 128 is indicative of the braking force being exerted upon the vehicle.

Output signal 130 is used to operate the spring rate adjustment mechanism 96 to selectively increase or decrease the effective volume of compressible liquid in the liquid spring structure, output signals 132 and 134 are used to respectively operate the high speed rotary actuators 84 and 92 used to rotate the damping valves 74 and 76, and output signal 136 is used to operate the pressure regulator mechanism 98 to selectively vary the compressible liquid pressure within the liquid spring.

In this manner, both the spring force characteristics and the bounce and rebound damping characteristics of liquid spring 12 (and, of course, the liquid springs operatively associated with the other vehicle wheels) are continuously monitored and automatically varied in response to variations in both vehicle operating parameters and positional and pressure operating parameters of the liquid spring itself. For example, the previously described continuous sensing of the liquid pressures in rebound and bounce subchambers $36_a$ and $36_b$, and the vertical position within housing chamber 36 of piston 40, enables computer 16 to compute, at any given instant, the direction of relative travel of the piston, its velocity, and its acceleration relative to the housing, and responsively vary one or more of the output signals 130–136 to substantially instantaneously adjust the effective piston velocity and/or acceleration during either a bounce or rebound stroke of the wheel structure.

It can thus be seen that the control system schematically depicted in FIG. 1 may be conveniently utilized to continuously and automatically adjust the spring and damping characteristics of the liquid spring 12 to generally optimize its suspension performance essentially regardless of what combination of road conditions and driver control inputs the operated vehicle encounters at a given instant.

It should be noted that the schematically illustrated suspension system 10 is merely representative and could be modified in a variety of manners if desired. For example, the liquid spring 12, while illustrated as a double rod end type, could also be of the single rod end type, and could be interconnected between the vehicle frame and wheel structures in a variety of alternate manners and orientations. The sensing of the housing and piston positions could be achieved in a variety of alternate manners, as could the variable damping bypass flow across the piston 40. Further, the volume and pressure adjustment mechanisms 96, 98 could be structured and controlled differently, and the number and type of liquid spring and vehicle operating parameter input signals could be varied to suit a particular suspension application.

The foregoing detailed description is to be clearly understood as being given by way of illustration and example only, the spirit and scope of the present invention being limited solely by the appended claims.

What is claimed is:

1. A suspension system for use on a vehicle having a frame, a wheel structure, and a means for producing a signal representative of a vehicle operating parameter, said suspension system comprising:

liquid spring means, operably interposed between said frame and said wheel structure, said liquid spring means including a housing having a chamber in which a first volume of compressible liquid is disposed;

piston means reciprocally disposed within said chamber and dividing it into bounce and rebound subchambers;

rod means carried by said housing for movement relative thereto into and out of said chamber and secured to said piston means;

a second volume of compressible liquid; and valve means selectively operable to place said second volume in communication with said bounce subchamber and said rebound subchamber through respective first and second port means disposed on opposite sides of said piston means;

said liquid spring means operable for utilizing to exert spring and damping forces to both statically and reactively control relative vertical displacement between said frame and said wheel structure, said liquid spring means having spring characteristics dependent upon liquid volume and pressure and damping characteristics dependent upon rate of flow of liquid bypassing said piston; and means including a digital computer for varying at least one of said volume, pressure or rate of liquid flow to change at least one of said spring and damping characteristics in response to a sensed variation in at least one of said signals representative of the operating parameters during operation of the vehicle.

* * * * *

UNITED STATES PATENT AND TRADEMARK OFFICE
CERTIFICATE OF CORRECTION

PATENT NO. : 5,316,272
DATED : May 31, 1994
INVENTOR(S) : Leo W. Davis

It is certified that error appears in the above-indentified patent and that said Letters Patent is hereby corrected as shown below:

In column 8, line 46, add --said compressible liquid-- after "utilizing."

Signed and Sealed this

Sixteenth Day of August, 1994

Attest:

BRUCE LEHMAN

Attesting Officer

Commissioner of Patents and Trademarks